(12) United States Patent
Yoshida

(10) Patent No.: US 7,035,125 B2
(45) Date of Patent: Apr. 25, 2006

(54) SWITCHING POWER SUPPLY AND CONTROL METHOD FOR THE SAME

(75) Inventor: Koji Yoshida, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 288 days.

(21) Appl. No.: 10/763,841

(22) Filed: Jan. 23, 2004

(65) Prior Publication Data

US 2004/0190314 A1   Sep. 30, 2004

(30) Foreign Application Priority Data

Feb. 5, 2003   (JP) .............................. 2003-028806

(51) Int. Cl.
*H02M 7/48* (2006.01)
*H02M 3/335* (2006.01)

(52) U.S. Cl. .............................. 363/71; 363/95; 363/26

(58) Field of Classification Search .................. 363/24, 363/25, 26, 65, 71, 95, 97
See application file for complete search history.

(56) References Cited

U.S. PATENT DOCUMENTS 5,191,519 A * 3/1993 Kawakami .................... 363/71
6,940,261 B1 * 9/2005 Umminger .................. 323/282

FOREIGN PATENT DOCUMENTS

JP   62138061 A   6/1987

* cited by examiner

*Primary Examiner*—Adolf Berhane
(74) *Attorney, Agent, or Firm*—Akin Gump Strauss Hauer & Feld, LLP

(57) ABSTRACT

In a switching power supply and a control method for the same in accordance with the present invention, a first error amplifier generates a first error signal by comparing the output signals of a plurality of converters with a reference voltage, an arithmetic unit generates a single output signal by adding the currents output from the rectifying means of the plurality of converters, a second error amplifier generates a second error signal by comparing the single output signal with the output of the first error amplifier, and PWM signal generators generate PWM signals on the basis of the output signal of the second error amplifier to PWM control each of a plurality of switching devices.

11 Claims, 6 Drawing Sheets

SWITCHING POWER SUPPLY AND CONTROL METHOD FOR THE SAME

BACKGROUND OF THE INVENTION

The present invention relates to a switching power supply for supplying a stabilized DC voltage to industrial and consumer electronic appliances and to a control method for the same. More particularly, the present invention relates to improvements in the stability of a switching power supply comprising a plurality of switching power supply circuits.

In recent years, as electronic appliances are made more inexpensive, compact, efficient and energy saving, switching power supplies being inexpensive, compact and efficient and having output stability are demanded strongly as power supplies for use in these electronic appliances. In particular, in the case of power supplies for supplying electric power to semiconductor devices, as semiconductor devices are made more highly integrated, power supplies having higher stability at a lower voltage and capable of supplying a larger current are demanded strongly. In a switching power supply circuit in a switching power supply, an AC voltage having a rectangular waveform is generated by switching devices that repeat ON/OFF operation. The voltage is then changed to a desired AC voltage by using a high-frequency transformer and converted into a DC voltage by using a rectifier circuit and a smoothing circuit. The transformer for use in this switching power supply has a configuration wherein a primary winding and a secondary winding thereof are obtained by winding a wire on a magnetic substance by a plurality of times. Voltages applied to and induced in the windings are changed by adjusting the number of turns thereof. Generally speaking, in a switching-power supply circuit, a rough voltage change is carried out by the transformer, and a fine voltage adjustment is carried out by the PWM control of the ON/OFF ratios of the switching devices. The numbers of turns of the primary winding and the secondary winding of the transformer are determined mainly by a voltage to be applied. The higher the voltage, the more the number of turns required. The more the number of turns of each winding of the transformer, the larger the volume of a portion required for insulation between the windings. As a result, there is a problem of increasing the outer dimensions of the transformer.

A voltage nearly proportional to an input voltage is applied to switching devices in a switching power supply circuit. In the case when the input voltage is high, a high voltage is applied thereto. A semiconductor device is mainly used as the switching device. In the case of a semiconductor device in which the voltage applied at the OFF time is high, the resistance and the voltage drop at the ON time are generally large. As a result, the loss in the semiconductor device increases, and radiating means for dissipating the heat due to this loss is made larger, whereby it is difficult to make the apparatus more compact. To solve this problem, a configuration is devised wherein each input side of a plurality of switching power supply circuits are connected in series so that the voltages applied to the respective switching devices are lowered.

The series connection system on the input sides of a plurality of switching power supply circuits in a conventional switching power supply is known in Official Gazette of Unexamined Patent Publication No. Sho 62-138061.

FIG. 4 is a circuit diagram showing a configuration example of a conventional switching power supply wherein the input sides of a plurality of switching power supply circuits are connected in series. In FIG. 4, an input DC voltage from an input DC power supply 201 is supplied across input terminals 202a and 202b. The series circuit of a plurality of capacitors 203, 204, 205 and 206 is connected across the input terminals 202a and 202b. The input DC voltage applied across the input terminals 202a and 202b is divided by the respective capacitors 203, 204, 205 and 206. In the descriptions given below, the plurality of capacitors 203, 204, 205 and 206 connected across the input terminals 202a and 202b are referred to as a first capacitor 203, a second capacitor 204, a third capacitor 205 and a fourth capacitor 206, respectively. The series circuit of a first switching device 207 and a second switching device 208 is connected across both ends of the series circuit of the first capacitor 203 and the second capacitor 204. Furthermore, the series circuit of a third switching device 209 and a fourth switching device 210 is connected across both ends of the series circuit of the third capacitor 205 and the fourth capacitor 206.

A first transformer 211 has a primary winding 211a, a first secondary winding 211b and a second secondary winding 211c. One end of the primary winding 211a is connected to the connection point of the first capacitor 203 and the second capacitor 204, and the other end of the primary winding 211a is connected to the connection point of the first switching device 207 and the second switching device 208. The first secondary winding 211b and the second secondary winding 211c are connected in series.

A second transformer 212 has a primary winding 212a, a first secondary winding 212b and a second secondary winding 212c. One end of the primary winding 212a is connected to the connection point of the third capacitor 205 and the fourth capacitor 206, and the other end of the primary winding 212a is connected to the connection point of the third switching device 209 and the fourth switching device 210. The first secondary winding 212b and the second secondary winding 212c are connected in series.

An anode of a first rectifier diode 213 is connected to the first secondary winding 211b of the first transformer 211, and an anode of a second rectifier diode 214 is connected to the second secondary winding 211c. Cathodes of the first rectifier diode 213 and the second rectifier diode 214 are connected to each other. As described above, the first rectifier diode 213 and the second rectifier diode 214 are connected to the first transformer 211, thereby rectifying the voltages generated in the first secondary winding 211b and the second secondary winding 211c.

As shown in FIG. 4, one end of the series circuit of a first choke coil 215 and a smoothing capacitor 216 is connected to the connection point of the first secondary winding 211b and the second secondary winding 211c. The other end of this series circuit is connected to the connection point (cathodes) of the first rectifier diode 213 and the second rectifier diode 214.

An anode of a third rectifier diode 217 is connected to the first secondary winding 212b of the second transformer 212, and an anode of a fourth rectifier diode 218 is connected to the second secondary winding 212c. Cathodes of the third rectifier diode 217 and the fourth rectifier diode 218 are connected to each other. As described above, the third rectifier diode 217 and the fourth rectifier diode 218 are connected to the second transformer 212, thereby rectifying the voltages generated in the first secondary winding 212b and the second secondary winding 212c.

One end of a second choke coil 219 is connected to the connection point (cathodes) of the third rectifier diode 217 and the fourth rectifier diode 218, and the other end thereof is connected to one end of the smoothing capacitor 216. The smoothing capacitor 216 is connected across output terminals 220a and 220b, and a load 221 connected across the output terminals 220a and 220b consumes electric power.

As shown in FIG. 4, the voltage generated at the output terminal 220a on the positive side is input to one end of an error amplifier 223, and the reference voltage from a reference power supply 222 is input to the other end of the error amplifier 223. The error amplifier 223 compares the output voltage across the output terminals 220a and 220b with the reference voltage of the reference power supply 222 and amplifies the error therebetween.

A triangular wave generation circuit 224 generates a reference triangular wave signal serving as a reference for generating a PWM signal supplied to each of the first switching device 207 to the fourth switching device 210. The generated reference triangular wave signal is input to one end of a comparator 225. The comparator 225 compares the reference triangular wave signal with output of the error amplifier 223, thereby generating the PWM signal. The PWM signal generated by the comparator 225 is alternately distributed by a distributor 226 to the two output terminals thereof, thereby driving each of the first switching device 207 to the fourth switching device 210.

The operation of the conventional switching power supply configured as described above will be described referring to the operation waveform diagram of FIG. 5.

In FIG. 5, a waveform A shown in a part of (a) is a waveform of the output signal from the error amplifier 223, and a waveform B shown in the part of (a) is a waveform of the output signal from the triangular wave generation circuit 224. A part of (b) in FIG. 5 shows a waveform of the output signal of the comparator 225. A part of (c) in FIG. 5 shows a waveform of the drive signal of the first switching device 207 and the third switching device 209. A part of (d) in FIG. 5 shows the waveform of the drive signal of the second switching device 209 and the fourth switching device 210. A part of (e) in FIG. 5 shows a waveform of the applied voltage of the first switching device 207, and a part of (f) shows a waveform of the applied voltage of the second switching device 208. A part of (g) in FIG. 5 shows a waveform of the applied voltage of the primary winding 211a of the first transformer 211 and the primary winding 212a of the second transformer 212, and a part of (h) shows a waveform of the current of the first choke coil 215 and the second choke coil 219.

As shown in parts of (c) and (d) in FIG. 5, the first switching device 207 and the second switching device 208 are operated at a phase difference of 180 degrees therebetween by drive signals from the distributor 226, thereby turned ON/OFF at nearly the same duty ratio so as not to be turned ON simultaneously.

When the first switching device 207 is in the ON state, the voltage of the first capacitor 203 is applied to the primary winding 211a of the first transformer 211. When the second switching device 208 is in the ON state, the voltage of the second capacitor 204 is applied to the primary winding 211a of the first transformer 211. Furthermore, when the first switching device 207 is in the ON state, the voltage obtained by addition of the voltage of the first capacitor 203 and the voltage of the second capacitor 204 is applied to the second switching device 208 (see the part of (f) in FIG. 5). When the second switching device 208 is in the ON state, the voltage obtained by the addition of the voltage of the first capacitor 203 and the voltage of the second capacitor 204 is applied to the first switching device 207 (see the part of (e) in FIG. 5).

When both the first switching device 207 and the second switching device 208 are in the OFF state, the voltage of the first capacitor 203 and the voltage of the second capacitor 204 are applied to them, respectively.

The change in the applied voltage during the ON/OFF operation of the third switching device 209 and the fourth switching device 210 is similar to the above-mentioned change in the applied voltage during the ON/OFF operation of the first switching device 207 and the second switching device 208.

When it is assumed that duty ratios of the first switching device 207 to the fourth switching device 210 are nearly the same, the applied voltages of the first capacitor 203 to the fourth capacitor 206 become nearly the same, that is, ¼ of the input DC voltage, respectively. Hence, only the half of the input DC voltage is applied to the respective switching devices 207, 208, 209 and 210. In addition, only ¼ of the input DC voltage is applied to the primary windings 211a and 212a of the transformers 211 and 212.

Voltages generated in the secondary windings 211b and 211c of the first transformer 211 and the secondary windings 212b and 212c of the second transformer 212 are rectified by the first to fourth rectifier diodes 213, 214, 217 and 218, and smoothened by the first choke coil 215, the second choke coil 219 and the smoothing capacitor 216.

Only during the ON periods of the first to fourth switching devices 207, 208, 209 and 210, a voltage represented by (¼)·(Ns/Np)·Vin is generated in the secondary windings 211b and 211c of the first transformer 211 and the secondary windings 212b and 212c of the second transformer 212. Herein, Np designates the number of turns of the primary winding 211a of the first transformer 211 and the number of turns of the primary winding 212a of the second transformer 212. Ns designates the number of turns of the secondary windings 211b and 211c of the first transformer 211 and the number of turns of the secondary windings 212b and 212c of the of the second transformer 212. In addition, Vin designates the value of the input DC voltage. Hence, the output voltage value after smoothing can be adjusted by adjusting the ON periods of the first to fourth switching devices 207, 208, 209 and 210, and-by changing the product of the voltage applied to the first choke coil 215 and the second choke coil 219 and the time of the voltage application.

The output voltage is compared with the reference voltage of the reference power supply 222 by the error amplifier 223. The error obtained by the comparison is amplified and then compared with the reference triangular wave signal by the comparator 225 and fed back to the PWM signal. In this way, in the conventional switching power supply shown in FIG. 4, the output voltage is fed back, and the output is stabilized.

In the conventional switching power supply wherein the input side DC connection system is used as described above, the voltage applied to each switching device is a half of the input voltage, and the voltage applied to the primary winding of each transformer is ¼ of the input voltage. Therefore, in half-bridge converters, the applied voltage of each switching device and the applied voltage of the primary winding of each transformer can be halved approximately. As a result, in the conventional switching power supply, switching devices with low breakdown voltages can be used, and the numbers of turns of the windings of the transformers can be decreased.

Next, current mode control being used as a control method in a conventional switching power supply will be described.

FIG. 6 is a circuit diagram showing a case wherein the current mode control is applied to a switching power supply having a step-down converter. In FIG. 6, the input DC voltage from an input DC power supply 201 is supplied across input terminals 202*a* and 202*b*, and a capacitor 227 is connected across the input terminals 202*a* and 202*b*. The series connection of a first switching device 228 and a second switching device 229 is connected to the capacitor 227. The first switching device 228 and the second switching device 229 repeat ON/OFF operation alternately.

As shown in FIG. 6, one end of a choke coil 230 is connected to the connection point of the first switching device 228 and the second switching device 229, and the other end of the choke coil 230 is connected to a smoothing capacitor 231. The choke coil 230 and the smoothing capacitor 231 are connected in series, and the smoothing capacitor 231 is connected across output terminals 232*a* and 232*b*. Electric power is supplied to a load 233 connected across the output terminals 232*a* and 232*b*.

In the conventional switching power supply configured as described above, when the first switching device 228 is in the ON state, the input voltage is applied to the series circuit of the choke coil 230 and the smoothing capacitor 231. When the second switching device 229 is in the ON state, the series circuit of the choke coil 230 and the smoothing capacitor 231 is short-circuited.

As shown in FIG. 6, the voltage generated in the output terminal. 232*a* on the positive side is input to one end of a first error amplifier 235. The reference voltage from a reference power supply 234 is input to the other end of the first error amplifier 235. The first error amplifier 235 compares the output voltage across the output terminals 232*a* and 232*b* with the reference voltage of the reference power supply 234, amplifies the error therebetween and outputs the amplified error to a second error amplifier 237. A current detector 236 detects the current flowing in the choke coil 230 and outputs the detected current to the second error amplifier 237. The second error amplifier 237 compares the output of the first error amplifier 235 with the output of the current detector 236, amplifies the error therebetween and outputs the amplified error to a comparator 239. The comparator 239 compares the reference triangular wave signal from a triangular wave generator 238 with the output of the second error amplifier 237 and generates a PWM signal. This PWM signal determines the ON period of the first switching device 228 and drives the first switching device 228. An inverter 240 inverts the PWM signal from the comparator 239 and drives the second switching device 229.

Next, an operation of the conventional switching power supply configured as shown in FIG. 6 will be described.

When the state averaging method is used, it is assumed that by the series circuit of the first switching device 228 and the second switching device 229, an amount of the input voltage Vin, corresponding to the duty ratio D thereof, is applied to the series circuit of the choke coil 230 and the smoothing capacitor 231. Hence, state equations represented by the following equations (1) to (3) are established. Herein, vout designates an output voltage, and iL designates an output current (choke coil current). Furthermore, the Laplace transforms of the output current iL and the output voltage vout are assumed to be I and V, respectively.

$$\frac{di_L}{dt} = \frac{1}{L}v_{out} + \frac{V_{in}}{L}\delta \quad (1)$$

$$\frac{dv_{out}}{dt} = -\frac{1}{CR}v_{out} + \frac{1}{C}i_L \quad (2)$$

$$s\begin{pmatrix}I\\V\end{pmatrix} = \begin{pmatrix}0 & -\frac{1}{L}\\ \frac{1}{C} & -\frac{1}{CR}\end{pmatrix}\begin{pmatrix}I\\V\end{pmatrix} + \begin{pmatrix}\frac{V_{in}}{L}\\0\end{pmatrix}\delta \quad (3)$$

wherein, I is represented by equation (4), and V is represented by equation (5).

$$I = \frac{\left(s + \frac{1}{CR}\right)}{s\left(s + \frac{1}{CR}\right) + \frac{1}{LC}} \cdot \frac{V_{in}}{L} \cdot \delta \quad (4)$$

$$V = \frac{\frac{1}{C}}{s\left(s + \frac{1}{CR}\right) + \frac{1}{LC}} \cdot \frac{V_{in}}{L} \cdot \delta \quad (5)$$

As shown in equation (5), a second-order lag occurs for the output voltage, and a phase lag of up to 180 degrees is generated. However, as shown in equation (4), for the choke coil current serving as an output current, a little phase lag occurs at the resonance point. However, since the numerator is first-order, a phase lag of about 90 degrees is generated. Hence, it is understood that the PWM control of the choke coil current becomes far more stable than the PWM control of the output voltage. The current mode control in the conventional switching power supply shown in FIG. 6 uses PWM to control the current of the choke coil 230. An error signal between the output voltage and the reference voltage is amplified, and the amplified signal is used as the reference signal that is used for the control. The relationship between the choke coil current and the output voltage is represented by the following equation (6).

$$V = \frac{\frac{1}{C}}{s + \frac{1}{CR}} \cdot I \quad (6)$$

A current control loop in the current mode control configured as described above has characteristics that its phase lag is small, its operation is stable, and its gain can be set at a large value. Since this current control loop basically forms a first-order lag system, even when its bandwidth is made larger, oscillation due to a phase lag does not occur. By virtue of the configuration using the current mode control as described above, the characteristic of the transmission from the reference signal to the choke coil current serving as an output current has almost no lag. Hence, a loop gain of the voltage control system can be made stable by using a general PI control.

As described above, in the series connection system on the input sides of the plurality of switching power supply circuits in the conventional switching power supply, switching devices with low breakdown voltages can be used, and the numbers of turns of the windings of the transformers can be decreased. However, the conventional switching power supply has a problem with respect to the stability of the output voltage. On the other hand, in the current mode control system, the output is stable, but this system has a problem wherein switching devices having breakdown voltages depending on the input voltage must be used.

However, in the field of the switching power supply, in addition to the demand for the high stability of the output voltage, the demand for the simultaneous use of the series connection system on the input sides of a plurality of switching power supply circuits and the current mode control system is increasing. When it is attempted to simultaneously use the series connection system of a plurality of switching power supply circuits and the current mode control system, the current value of each switching power supply circuit serving as a converter must be controlled so as to conform to the reference value of the current by using the error signal between the output voltage and the reference voltage. The change of the current balance among the respective converters in the case when differences are caused among the duty ratios of the respective converters will be considered herein. It is assumed that two converters, connected in series on the input sides, are A and B, respectively, and that their duty ratios are Da and Db. In addition, when the switching devices of the converters A and B are in the ON state, the currents flowing therein are determined by the currents flowing in the choke coils of the converters A and B. The currents (primary currents) flowing in the respective switching devices are assumed to be Isa and Isb. Since the two converters A and B are connected in series, the following equation (7) is established when the state is stable.

$$Da \times Isa = Db \times Isb \qquad (7)$$

Hence, when the duty ratio of one converter becomes relatively larger than the duty ratio of the other converter, the balance is maintained when the primary current in the one converter becomes smaller. In other words, when the duty ratio becomes larger, operation is carried out so that the primary current of the converter becomes smaller. This operation causes a contradiction wherein the duty ratio must be made larger to increase the output current, when the whole of the converter is considered. As a result, the individual current control becomes positive feedback, and no balance is obtained. Hence, the voltage balance at the time of the series connection of the plurality of converters is lost. This causes a serious problem of applying an excessive voltage to one of the converters.

Therefore, in the conventional switching power supply, in the case when it is attempted to apply the current mode control system to the series connection system on the input sides of a plurality of switching power supply circuits, a problem wherein the balance in current and voltage is not obtained among the converters. Hence, it is impossible to attain the object of carrying out the simultaneous use of the series connection system on the input sides of the switching power supply circuits and the current mode control system inside one apparatus.

BRIEF SUMMARY OF THE INVENTION

The present invention is intended to provide a switching power supply being highly stable, compact and highly efficient, capable of attaining the object of carrying out the simultaneous use of the series connection system on the input sides of switching power supply circuits and the current mode control inside one apparatus, and capable of properly maintaining the balance in current without impairing the characteristics of the conventional current mode control even when a plurality of switching power supply circuits are connected in series.

In order to attain the above-mentioned objects, the switching power supply in accordance with the present invention comprises:

a plurality of converters, each comprising a plurality of switching means, transforming means and rectifying means, connected in series on the input sides and in parallel on the output sides, thereby outputting a single output DC voltage, a first error amplifier for generating a first error signal by comparing the single output DC voltage output from the above-mentioned converters with a reference voltage and for amplifying the first error signal, an arithmetic unit for generating a single output current signal by adding the currents output from the above-mentioned rectifying means of the above-mentioned plurality of converters, a second error amplifier for generating a second error signal by comparing the single output current signal from the above-mentioned arithmetic unit with the output of the above-mentioned first error amplifier and for amplifying the second error signal, and a plurality of PWM signal generators for generating PWM signals on the basis of the output signal of the above-mentioned second error amplifier and for PWM controlling the above-mentioned plurality of switching means. Since the switching power supply in accordance with the present invention is configured as described above, the present invention can provide a switching power supply being highly stable, compact and highly efficient, and capable of properly maintaining the balance in current without impairing the characteristics of the current mode control even when the input sides of the plurality of converters are connected in series.

A control method for a switching power supply in accordance with the present invention comprising a plurality of converters, each comprising a plurality of switching means, transforming means and rectifying means, connected in series on the input sides and in parallel on the output sides, thereby outputting a single output DC voltage, comprising a step of generating a first error signal by comparing the above-mentioned single output DC voltage with a reference voltage and of amplifying the first error signal, a step of generating a single output current signal by adding the currents output from the above-mentioned rectifying means of the above-mentioned plurality of converters, a step of generating a second error signal by comparing the above-mentioned single output current signal with the above-mentioned first error signal amplified and of amplifying the second error signal, and a step of generating PWM signals on the basis of the above-mentioned second error signal amplified and of PWM controlling each of the above-mentioned plurality of switching means. Since the switching power supply control method in accordance with the present invention has these steps, high stability can be attained and the balance in current can be maintained properly without impairing the characteristics of the current mode control even when the input sides of the plurality of converters are connected in series.

While the novel features of the invention are set forth particularly in the accompanying claims, the invention, both as to configuration and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a switching power supply and a control method therefor in accordance with the present invention will be described below referring to the accompanying drawings.

Embodiment 1

Figure 1:
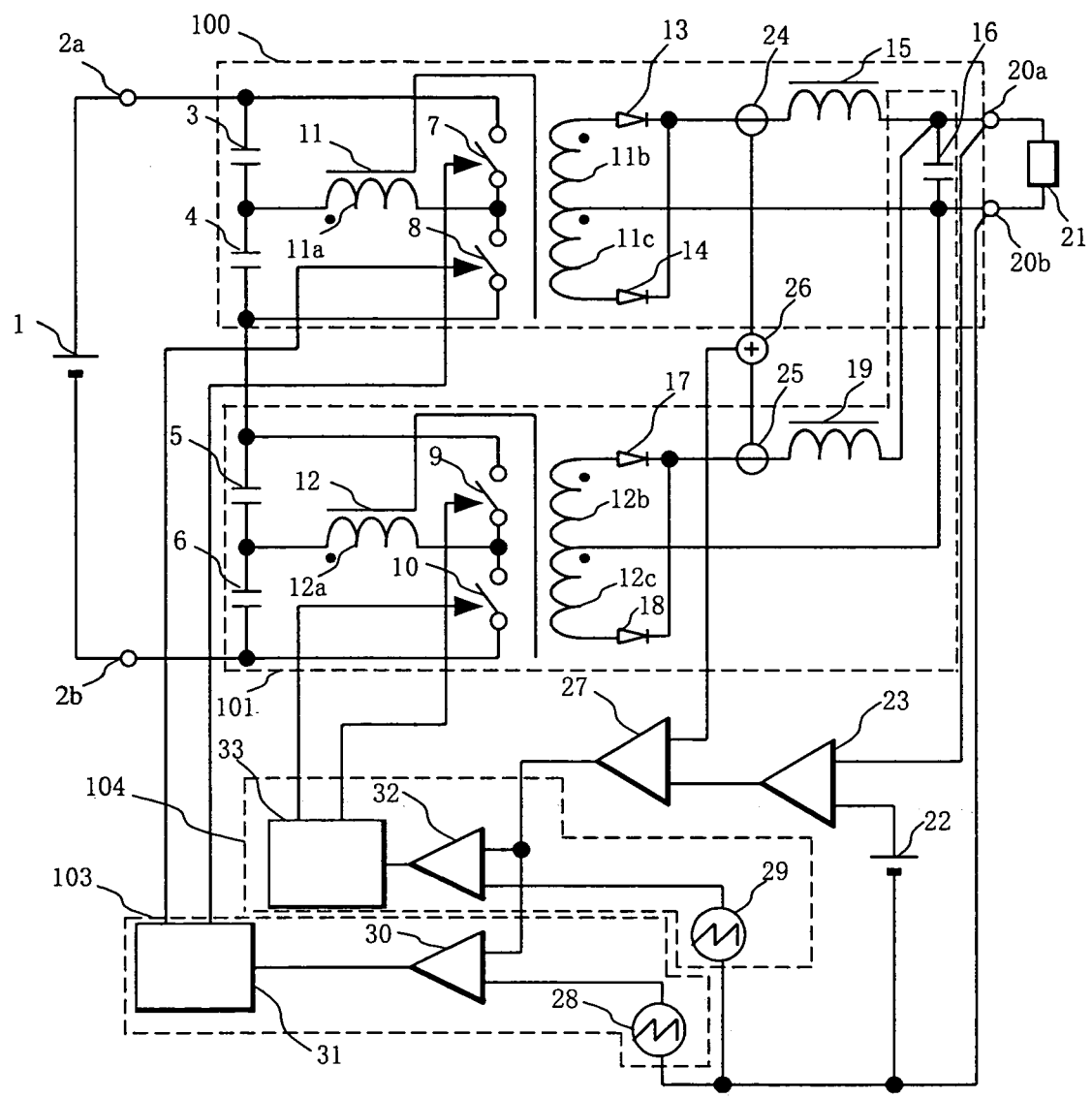
FIG. 1 is a circuit diagram showing the configuration of a switching power supply in accordance with Embodiment 1 of the present invention.

FIG. 1 is a circuit diagram showing a configuration of a switching power supply in accordance with Embodiment 1 of the present invention. In FIG. 1, the input DC voltage from an input DC power supply 1 is supplied across input terminals 2a and 2b. A series circuit of a plurality of capacitors 3, 4, 5 and 6 is connected across the input terminals 2a and 2b. The input DC voltage applied across the input terminals 2a and 2b is divided by the respective capacitors 3, 4, 5 and 6. In the descriptions given below, the plurality of capacitors 3, 4, 5 and 6 connected across the input terminals 2a and 2b are referred to as a first capacitor 3, a second capacitor 4, a third capacitor 5 and a fourth capacitor 6, respectively. The series circuit of a first switching device 7 and a second switching device 8 is connected across both ends of the series circuit of the first capacitor 3 and the second capacitor 4. Furthermore, the series circuit of a third switching device 9 and a fourth switching device 10 is connected across both ends of the series circuit of the third capacitor 5 and the fourth capacitor 6.

A first transformer 11 has a primary winding 11a, a first secondary winding 11b and a second secondary winding 11c. One end of the primary winding 11a is connected to the connection point of the first capacitor 3 and the second capacitor 4, and the other end of the primary winding 11a is connected to the connection point of the first switching device 7 and the second switching device 8. The first secondary winding 11b and the second secondary winding 11c are connected in series.

A second transformer 12 has a primary winding 12a, a first secondary winding 12b and a second secondary winding 12c. One end of the primary winding 12a is connected to the connection point of the third capacitor 5 and the fourth capacitor 6, and the other end of the primary winding 12a is connected to the connection point of the third switching device 9 and the fourth switching device 10. The first secondary winding 12b and the second secondary winding 12c are connected in series.

An anode of a first rectifier diode 13 is connected to the first secondary winding 11b of the first transformer 11, and an anode of a second rectifier diode 14 is connected to the second secondary winding 11c. Cathodes of the first rectifier diode 13 and the second rectifier diode 14 are connected to each other. As described above, the first rectifier diode 13 and the second rectifier diode 14 are connected to the first transformer 11, thereby rectifying the AC currents generated in the first secondary winding 11b and the second secondary winding 11c.

As shown in FIG. 1, one end of the series circuit of a first choke coil 15 and a smoothing capacitor 16 is connected to the connection point of the first secondary winding 11b and the second secondary winding 11c. The other end of this series circuit is connected to the connection point (cathodes) of the first rectifier diode 13 and the second rectifier diode 14.

An anode of a third rectifier diode 17 is connected to the first secondary winding 12b of the second transformer 12, and an anode of a fourth rectifier diode 18 is connected to the second secondary winding 12c. Cathodes of the third rectifier diode 17 and the fourth rectifier diode 18 are connected to each other. As described above, the third rectifier diode 17 and the fourth rectifier diode 18 are connected to the second transformer 12, thereby rectifying the AC currents generated in the first secondary winding 12b and the second secondary winding 12c.

One end of a second choke coil 19 is connected to the connection point (cathodes) of the third rectifier diode 17 and the fourth rectifier diode 18, and the other end thereof is connected to one end of the smoothing capacitor 16. The smoothing capacitor 16 is connected across output terminals 20a and 20b, and electric power is supplied to a load 21 connected across the output terminals 20a and 20b.

As shown in FIG. 1, the voltage generated at the output terminal 20a on the positive side is input to one end of a first error amplifier 23, and the reference voltage from a reference power supply 22 is input to the other end of the first error amplifier 23. The first error amplifier 23 compares the output voltage across the output terminals 20a and 20b with the reference voltage of the reference power supply 22 and amplifies the error therebetween.

A first current detector 24 detects the current flowing in the first choke coil 15, and a second current detector 25 detects the current flowing in the second choke coil 19. An adder 26 serving as an arithmetic unit adds the output of the first current detector 24 and the output of the second current detector 25, generates a single current signal, and outputs the signal to a second error amplifier 27. The second error amplifier 27 compares the output of the first error amplifier 23 and the output of the adder 26 and amplifies the error therebetween.

A first triangular wave generator 28 generates a first reference triangular wave signal serving as a reference for generating a first PWM signal supplied to the first switching device 7 and the second switching device 8. The first reference triangular wave signal from the first triangular wave generator 28 is supplied to one input terminal of a first comparator 30. The first comparator 30 compares the first reference triangular wave signal with the output signal from the second error amplifier 27, thereby generating the first PWM signal. The first PWM signal generated by the first comparator 30 is alternately distributed by a first distributor 31 to the two output terminals thereof, thereby driving the first switching device 7 and the second switching device 8, respectively.

A second triangular wave generator 29 generates a second reference triangular wave signal serving as a reference for generating a second PWM signal supplied to the third switching device 9 and the fourth switching device 10. The second reference triangular wave signal from the second triangular wave generator 29 is supplied to one input terminal of a second comparator 32. The second comparator 32 compares the second reference triangular wave signal with the output signal from the second error amplifier 27, thereby generating the second PWM signal. The second PWM signal generated by the second comparator 32 is alternately distributed by a second distributor 33 to the two output terminals thereof, thereby driving the third switching device 9 and the fourth switching device 10, respectively.

In the switching power supply in accordance with Embodiment 1, a first half-bridge converter 100 comprises the first capacitor 3, the second capacitor 4, the first switching device 7, the second switching device 8, the first transformer 11, the first rectifier diode 13, the second rectifier diode 14, the first choke coil 15 and the smoothing capacitor 16.

Furthermore, in the switching power supply in accordance with Embodiment 1, a second half-bridge converter 101 comprises the third capacitor 5, the fourth capacitor 6, the third switching device 9, the fourth switching device 10, the second transformer 12, the third rectifier diode 17, the fourth rectifier diode 18, the second choke coil 19 and the smoothing capacitor 16. In the switching power supply in accordance with Embodiment 1 shown in FIG. 1, the smoothing capacitor 16 is shared by the first half-bridge converter 100 and the second half-bridge converter 101.

In the switching power supply in accordance with Embodiment 1, the first half-bridge converter 100 and the second half-bridge converter 101 are drive-controlled by a control section. The control section comprises the first error amplifier 23, the first current detector 24, the second current detector 25, the adder 26, the second error amplifier 27, a first PWM signal generator 103 and a second PWM signal generator 104. The first PWM signal generator 103 comprises the first triangular wave generator 28, the first comparator 30 and the first distributor 31. The second PWM signal generator 104 comprises the second triangular wave generator 29, the second comparator 32 and the second distributor 33.

Figure 2:
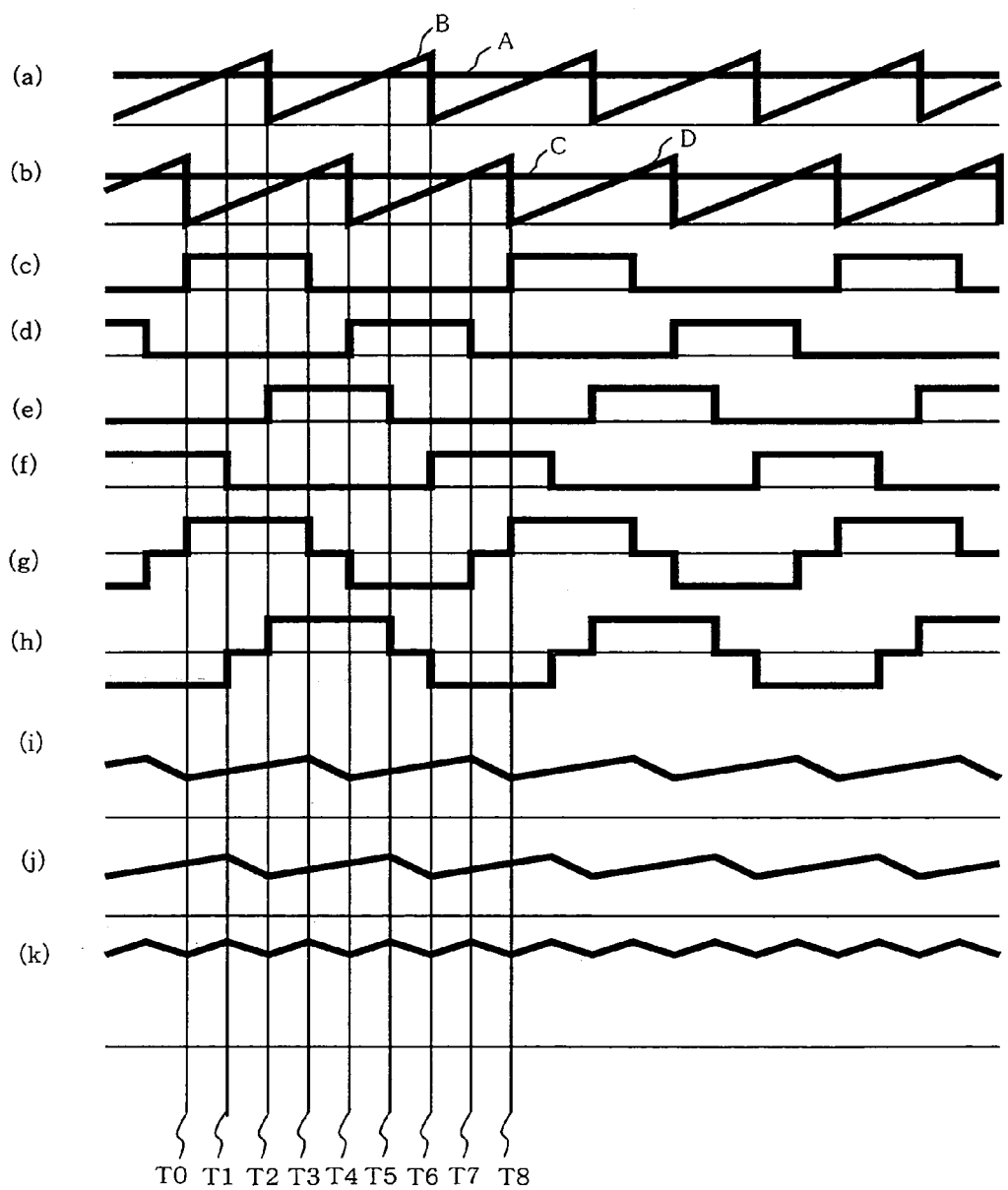
FIG. 2 is a waveform diagram showing the operation of the switching power supply in accordance with Embodiment 1 of the present invention.

The operation of the switching power supply in accordance with Embodiment 1 configured as described above will be described referring to FIG. 2. FIG. 2 is a signal waveform diagram at various sections in the switching power supply in accordance with Embodiment 1.

In FIG. 2, a waveform A shown in a part of (a) is a waveform of the output signal from the second error amplifier 27, and a waveform B shown in the part of (a) is a waveform of the output signal from the second triangular wave generator 29. A waveform C shown in a part of (b) in FIG. 2 is a waveform of the output signal from the second error amplifier 27, and a waveform D shown in the part of (b) is a waveform of the output signal from the first triangular wave generator 28. A part of (c) in FIG. 2 shows a waveform of the drive signal of the first switching device 7, and a part of (d) shows a waveform of the drive signal of the second switching device 8. A part of (e) in FIG. 2 shows a waveform of the drive signal of the third switching device 9, and a part of (f) shows a waveform of the drive signal of the fourth switching device 10. A part of (g) in FIG. 2 shows a waveform of the applied voltage of the primary winding 11a of the first transformer 11, and a part of (h) shows a waveform of the applied voltage of the primary winding 12a of the second transformer 12. A part of (i) in FIG. 2 shows a waveform of the current of the first choke coil 15, and a part of (j) shows a waveform of the current of the second choke coil 19. A part of (k) in FIG. 2 shows a waveform of the voltage output from the adder 26.

In FIG. 2, when the first switching device 7 is turned ON at time T0, the voltage held in the first capacitor 3 is applied to the primary winding 11a of the first transformer 11. At this time, a voltage is generated at the first secondary winding 11b of the first transformer 11 depending on the number of turns thereof, and the first rectifier diode 13 is turned ON. Hence, the voltage is applied to the first choke coil 15, and the current of the first choke coil 15 increases.

When the first switching device 7 is turned OFF at time T3, the primary winding 11a of the first transformer 11 becomes open, and no current flows. Hence, the current of the first choke coil 15 is divided and flows in the first secondary winding 11b and the second secondary winding 11c of the first transformer 11. For this reason, the first rectifier diode 13 and the second rectifier diode 14 are turned ON, and no voltage is generated in the primary winding 11a, the first secondary winding 11b and the second secondary winding 11c of the first transformer 11. Therefore, no voltage is applied to the series circuit of the first choke coil 15 and the smoothing capacitor 16, whereby the current of the first choke coil 15 decreases.

When the second switching device 8 is turned ON at time T4, the voltage of the second capacitor 4 is applied to the primary winding 11a of the first transformer 11. The voltage obtained at this time is opposite in polarity to the voltage obtained during the period from time T0 to time T3. Hence, voltages opposite in polarity are also generated in the first secondary winding 11b and the second secondary winding 11c of the first transformer 11, and the first rectifier diode 13 is turned OFF. At this time, a voltage depending on the turns ratio of the first transformer 11 is induced in the first choke coil 15 via the second rectifier diode 14 that is in the ON state, and the current flowing in the first choke coil 15 increases.

When the second switching device 8 is turned OFF at time T7, the primary winding 11a of the first transformer 11 becomes open, and no current flows. The current of the first choke coil 15 is divided and flows in the first secondary winding 11b and the second secondary winding 11c of the first transformer 11. For this reason, the first rectifier diode 13 and the second rectifier diode 14 are turned ON. At this time, no voltage is applied to all the windings of the first transformer 11. Therefore, no voltage is applied to the series circuit of the first choke coil 15 and the smoothing capacitor 16, whereby the current in the first choke coil 15 decreases.

The first half-bridge converter 100 of the switching power supply in accordance with Embodiment 1 operates as described above. A similar operation is carried out by the second half-bridge converter 101 comprising the third capacitor 5, the fourth capacitor 6, the third switching device 9, the fourth switching device 10, the second transformer 12, the third rectifier diode 17, the fourth rectifier diode 18, the second choke coil 19 and the smoothing capacitor 16. Hence, the detailed explanation of the operation of the second half-bridge converter 101 is omitted. However, the first half-bridge converter 100 and the second half-bridge converter 101 operate in synchronization with each other. Furthermore, there is a phase difference of 180 degrees between the reference triangular wave signal of the first triangular wave generator 28 and the reference triangular wave signal of the second triangular wave generator 29, these signals serving as reference signals. Hence, the secondary sides of the first half-bridge converter 100 and the second half-bridge converter 101 of the switching power supply in accordance with Embodiment 1 also operate with a phase difference of 180 degrees therebetween. In addition, the current flowing in the first choke coil 15 and the current flowing in the second choke coil 19 are added and output. With this configuration, ripples generated in each of them are cancelled and decreased.

Next, a control section of the switching power supply in accordance with Embodiment 1 will be described below. The control section drive-controls the first half-bridge converter 100 and the second half-bridge converter 101, and comprises the first error amplifier 23, the first current detector 24, the second current detector 25, the adder 26, the second error amplifier 27, the first PWM signal generator 103 and the second PWM signal generator 104.

In the switching power supply in accordance with Embodiment 1, the current flowing in the first choke coil 15 and the current flowing in the second choke coil 19 are added and smoothened by the smoothing capacitor 16, whereby a single output current is obtained. In addition, in Embodiment 1, the current detected by the first current detector 24 and the current detected by the second current detector 25 are added by the adder 26. Hence, the output of the adder 26 is a current for charging the smoothing capacitor 16. The first error amplifier 23 compares the output voltage across the output terminals 20a and 20b with the reference voltage of the reference power supply 22, and the error therebetween is amplified and used as a current reference signal. This current reference signal is compared with the output signal from the adder 26 by the second error amplifier 27, and the error therebetween is amplified. PWM control is carried out so that the error decreases. The reference triangular wave signals serving as the reference signals for the PWM control are output from the first triangular wave generator 28 and the second triangular wave generator 29 while having a phase difference of 180 degrees therebetween, and set so that the ON/OFF timing of each switching device is changed and so that ripple currents are cancelled at the output terminals.

A first PWM signal obtained by comparing the output of the first triangular wave generator 28 with the output of the second error amplifier 27 is distributed by the first distributor 31 to the two output terminals. The first distributor 31 drives the first switching device 7 and the second switching device 8 by using the distributed first PWM signal. Since the first PWM signal is distributed by the first distributor 31 and used to drive the first switching device 7 and the second switching device 8 as described above, the first switching device 7 and the second switching device 8 are not turned ON simultaneously.

Similarly, a second PWM signal obtained by comparing the output of the second triangular wave generator 29 with the output of the second error amplifier 27 is distributed by the second distributor 33 to the two output terminals. The second distributor 33 drives the third switching device 9 and the fourth switching device 10 by using the distributed second PWM signal. Since the second PWM signal is distributed by the second distributor 33 and used to drive the third switching device 9 and the fourth switching device 10, the third switching device 9 and the fourth switching device 10 are not turned ON simultaneously.

As described above, in the switching power supply in accordance with Embodiment 1, the sum of the output current of the first half-bridge converter 100 and the output current of the second half-bridge converter 101 is controlled so as to conform to the current reference signal. Hence, in the switching power supply in accordance with Embodiment 1, the first half-bridge converter 100 and the second half-bridge converter 101 are not controlled individually depending on the current reference signal. Hence, the phenomenon, wherein when the duty ratio changes, the current changes accordingly, for example, when the duty ratio increases (or decreases), the current decreases (or increases), having occurred in the case when the converters are controlled individually in the conventional switching power supply described in the above-mentioned prior art section, does not occur in the switching power supply in accordance with Embodiment 1. Therefore, in the switching power supply in accordance with Embodiment 1, a stable output current is generated at all times, and the output current can be controlled.

In the switching power, supply in accordance with Embodiment 1, the outputs of the first current detector 24 and the second current detector 25 are added by the adder 26, and the result of the addition is input to the second error amplifier 27. However, the adder for use in the present invention is not required to be an addition circuit in a strict sense. It may be a circuit having an offset required for securing the operating points of the adder 26 and the second error amplifier 27. Even when this kind of circuit is used, the switching control operation of the switching power supply is not affected. In addition, even when a nonlinear arithmetic unit having a monotone increasing or decreasing function is used instead of the adder, since the converters are not current-controlled individually, the effect of the present invention, that is, stable output, is maintained. The monotone increasing or decreasing function, y=f(x1, x2), is represented by the following inequality (8).

$$\frac{dy}{dx_n} \le 0 \text{ or } \frac{dy}{dx_n} \ge 0 \quad (n = 1, 2) \tag{8}$$

In particular, when a function symmetric with respect to each input of an adder, an integrator, etc. is used, the phase difference in the ripples of the current signal, different for each converter, can be eliminated, whereby more stable operation is obtained. For example, in a switching power supply comprising two converters, in the case when the outputs (x1, x2) from the two converters are input to an arithmetic unit, and when it is assumed that the output of the arithmetic unit is represented by equation (9), the arithmetic unit in accordance with the present invention has the condition represented by equation (10).

$$y=f(X1, X2) \tag{9}$$

$$y=f(X1, X2)=f(x2, x1) \tag{10}$$

In other words, even when the outputs (x1, x2) from the two converters are reversed and input to the arithmetic unit, the arithmetic unit in accordance with the present invention satisfies a condition wherein the output of the arithmetic unit becomes the same.

In particular, even in the case when either one of the inputs of the two converters is used, stable operation can be attained.

Similarly, in the case when three or more inputs are available for the arithmetic unit as shown in the configuration of Embodiment 2, respective conditions are a condition wherein when the combination of the input values is the same, the output becomes the same, and a condition wherein monotone increasing or decreasing is obtained for all the inputs. In addition, by using an adder in particular, the gain of the arithmetic unit is not changed depending on the current value, whereby the control circuit can be adjusted easily.

In Embodiment 1, an example of using an adder or an arithmetic unit is described. However, without using these, it may be possible to have a configuration wherein one of the outputs of the two converters is directly input to the second error amplifier 27, that is, a configuration wherein one of the detection signals of the first current detector 24 and the second current detector 25 is input to the second error amplifier 27.

In Embodiment 1, a half-bridge converter is taken as an example of a converter. However, the present invention is not limited to have this kind of configuration. A similar control system configuration is possible and stable operation can be attained even when other switching converters typified by the forward-type, bridge-type or push-pull-type switching converters are used and when their input sides (primary sides) are connected in series and their output sides (secondary sides) are connected in parallel. In particular, in the case when a half-bridge converter is used as a converter, the number of turns of the primary winding of the transformer is decreased and the voltage applied to the primary winding of the transformer of the half-bridge converter is lowered because of the input side series connection system. This is particularly effective in making the transformer more compact.

As described above, in the switching power supply in accordance with the present invention, voltages to be applied to the switching devices can be decreased by the series connection on the input sides, and high stability by the current mode control can be attained. In particular, in a power supply for supplying electric power to semiconductor devices, such as microprocessors, a relatively high bus voltage (for example, 48 V) for distributing electric power to various sections of an appliance is required to be converted into a highly stable low voltage (for example, 1 V) at a large current (for example, 100 A). The switching power supply in accordance with the present invention is configured so as to be able to carry out this conversion. The switching power supply in accordance with the present invention can conform to such a high bus voltage by connecting the input circuits in series and can attain high stability by the current mode control, thereby being effective particularly as a power supply for semiconductor devices.

Embodiment 2

Figure 3:
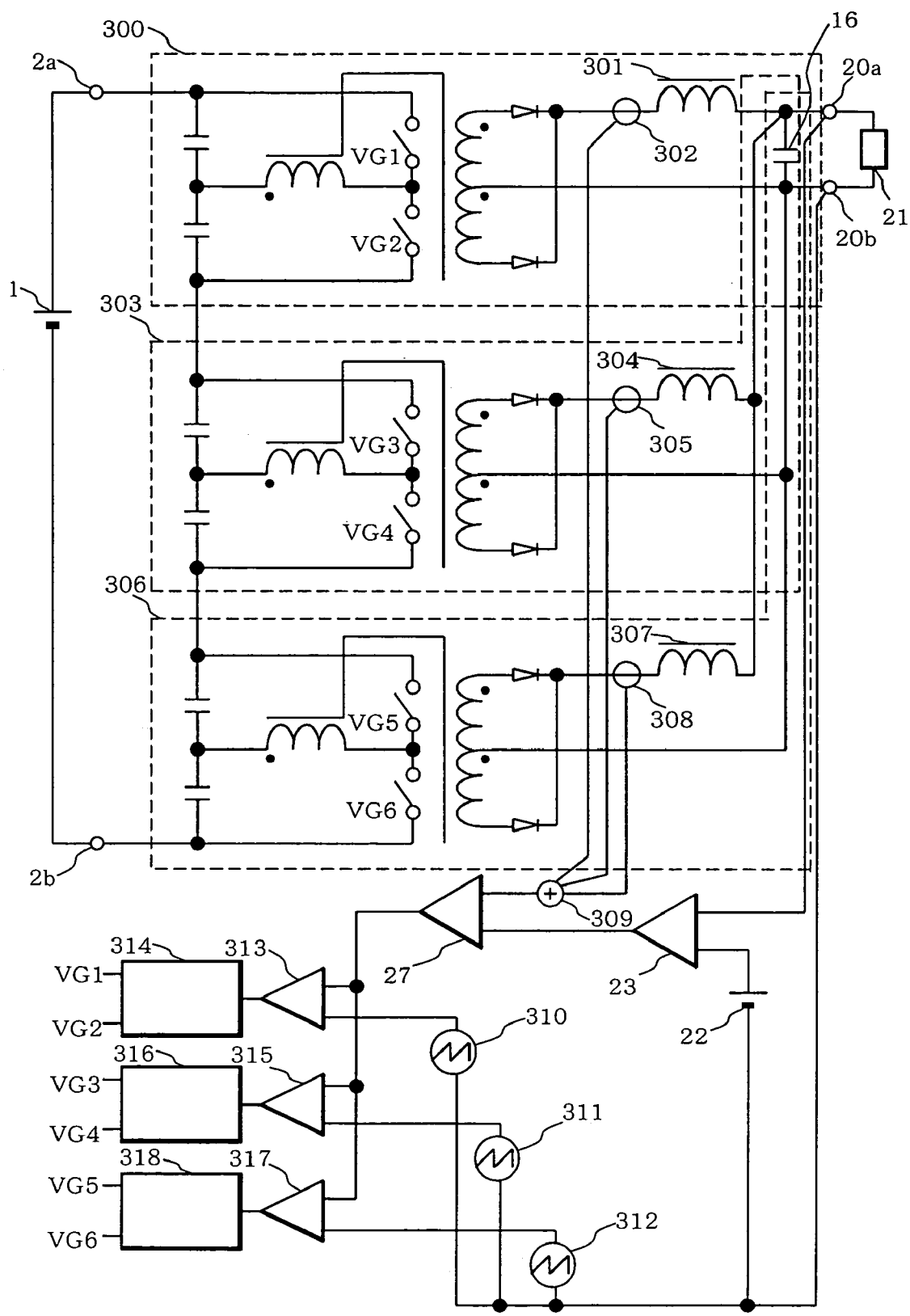
FIG. 3 is a circuit diagram showing the configuration of a switching power supply in accordance with Embodiment 2 of the present invention.
Figure 4:
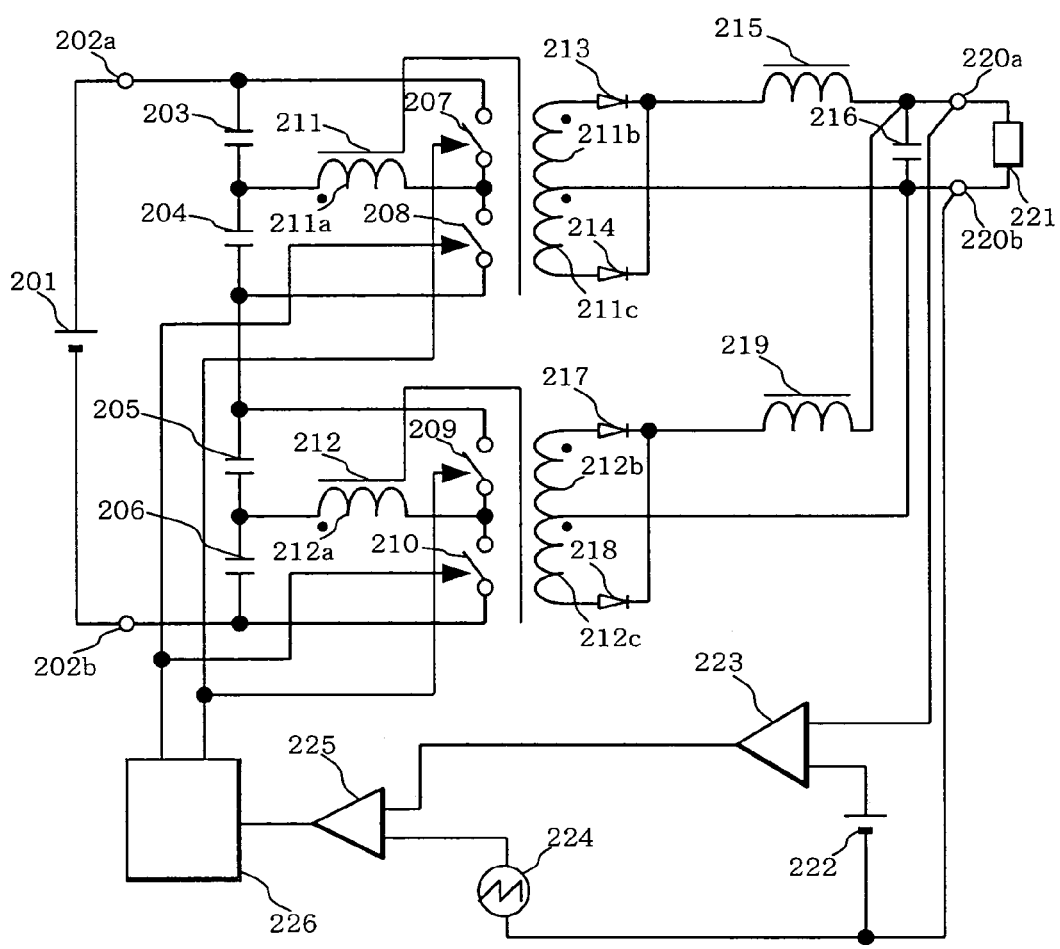
FIG. 4 is a circuit diagram showing the configuration of the conventional switching power supply.
Figure 5:
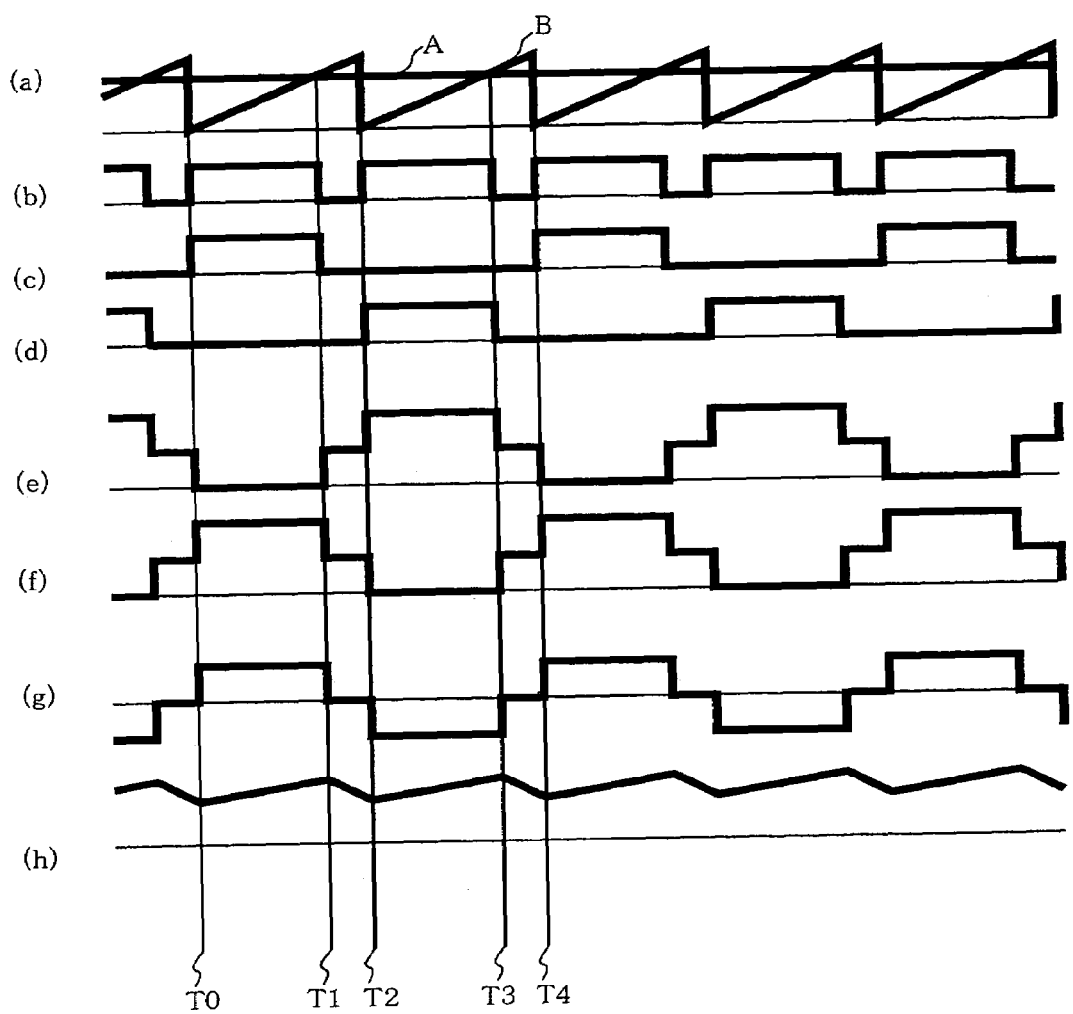
FIG. 5 is a waveform diagram showing the operation of the conventional switching power supply shown in FIG. 4.
Figure 6:
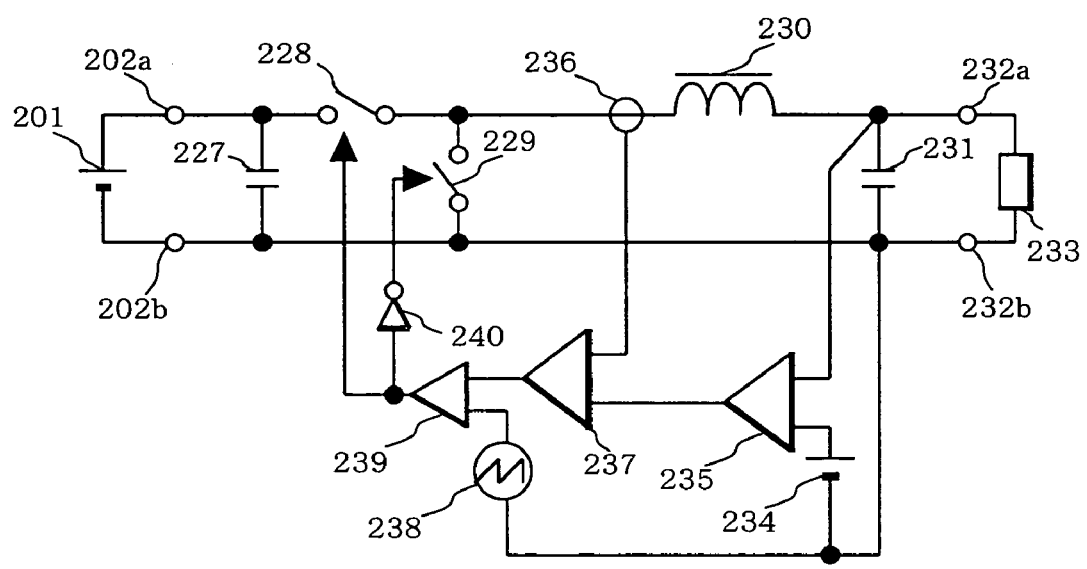
FIG. 6 is a circuit diagram showing the configuration of the conventional switching power supply.

FIG. 3 is a circuit diagram showing a configuration of a switching power supply in accordance with Embodiment 2 of the present invention. The switching power supply in accordance with Embodiment 2 differs from the switching power supply in accordance with Embodiment 1 in the number of half-bridge converters serving as converters. The switching power supply in accordance with Embodiment 1 comprises two half-bridge converters, but the switching power supply in accordance with Embodiment 2 comprises three half-bridge converters. Since the operation of each converter is the same as that described in the explanation of the above-mentioned Embodiment 1, its explanation is omitted herein to prevent overlapping.

In FIG. 3, the input DC voltage from an input DC power supply 1 is supplied across input terminals 2a and 2b. The respective input sides of a first half-bridge converter 300, a second half-bridge converter 303 and a third half-bridge converter 306 are connected in series across the input terminals 2a and 2b. The first to third half-bridge converters 300, 303 and 306 are each provided with capacitors, switching devices, a transformer, rectifier diodes, a choke coil, a current detector and a smoothing capacitor, just as in the case of the half-bridge converters 100 and 101 in accordance with the above-mentioned Embodiment 1.

After the respective output currents of the first half-bridge converter 300, the second half-bridge converter 303 and the third half-bridge converter 306 are added, the obtained current is smoothened by a smoothing capacitor. 16, whereby ripple currents in the current are absorbed. The smoothing capacitor 16 is connected across output terminals 20a and 20b. Electric power is supplied to a load 21 connected across the output terminals 20a and 20b.

As shown in FIG. 3, the voltage generated at the output terminal 20a on the positive side is input to one end of a first error amplifier 23, and the reference voltage from a reference power supply 22 is input to the other end of the first error amplifier 23. The first error amplifier 23 compares the output voltage across the output terminals 20a and 20b with the reference voltage of the reference power supply 22 and amplifies the error therebetween.

A first current detector 302 detects the current flowing in a first choke coil 301, a second current detector 305 detects the current flowing in a second choke coil 304, and a third current detector 308 detects the current flowing in a third choke coil 307. An adder 309 serving as an arithmetic unit adds the respective outputs of the first current detector 302, the second current detector 305 and the third current detector 308, generates a single current signal and outputs the signal to a second error amplifier 27. The second error amplifier 27 compares the output of the first error amplifier 23 and the output of the adder 309 and amplifies the error therebetween.

The first reference triangular wave signal from a first triangular wave generator 310 is supplied to one input terminal of a first comparator 313. The first comparator 313 compares the first reference triangular wave signal with the output signal from the second error amplifier 27, thereby generating a first PWM signal. The first PWM signal generated by the first comparator 313 is alternately distributed by a first distributor 314 to the two output terminals thereof, thereby driving each of the two switching devices VG1 and VG2 of the first half-bridge converter 300.

The second reference triangular wave signal from a second triangular wave generator 311 is supplied to one input terminal of a second comparator 315. The second comparator 315 compares the second reference triangular wave signal with the output signal from the second error amplifier 27, thereby generating a second PWM signal. The second PWM signal generated by the second comparator 315 is alternately distributed by a second distributor 316 to the two output terminals thereof, thereby driving each of the two switching devices VG3 and VG4 of the second half-bridge converter 303.

The third reference triangular wave signal from a third triangular wave generator 312 is supplied to one input terminal of a third comparator 317. The third comparator 317 compares the third reference triangular wave signal with the output signal from the second error amplifier 27, thereby generating a third PWM signal. The third PWM signal generated by the third comparator 317 is alternately distributed by a third distributor 318 to the two output terminals thereof, thereby driving each of the two switching devices VG5 and VG6 of the third half-bridge converter 306.

There is a phase difference of 120 degrees among the first to third reference triangular wave signals output from the first to third triangular wave generators 310, 311 and 312, and ripple currents at the output terminals of the first to third half-bridge converters 300, 303 and 306 are cancelled and decreased.

An operation of the switching power supply in accordance with Embodiment 2 configured as described above will be described below.

The operation of the switching power supply in accordance with Embodiment 2 differs from that of the switching power supply in accordance with the above-mentioned Embodiment 1 in that the components number of the half-bridge converters is three. The switching power supply is operated in three phases by the output currents of the first to third half-bridge converters 300, 303 and 306 while having a phase difference of 120 degrees among them. These output currents are added, and the ripple currents thereof are cancelled with one another.

In the switching power supply in accordance with Embodiment 2, the input voltage of each of the half-bridge converters is further lowered. The voltage applied to each switching device is ⅓ of the input voltage, that is, (⅓)Vin. The voltage applied to the primary winding of the transformer is ⅙ of the input voltage, that is, (⅙)Vin. Hence, the configuration of Embodiment 2 is advantageous in making the switching power supply more efficient and making the transformer more compact. Furthermore, in the switching power supply in accordance with Embodiment 2, the frequency of the output ripples is three times the frequency obtained during independent operation. Hence, it is possible to have an excellent effect of attaining stabilization by using fewer smoothing capacitors.

The control section of the switching power supply in accordance with Embodiment 2 drive-controls the first to third half-bridge converters 300, 303 and 306. The control section comprises the first error amplifier 23, the second error amplifier 27, the first to third current detectors 302, 305 and 308, the adder 309, the first to third triangular wave generators 310, 311 and 312, the first to third comparators 313, 315 and 317, and the first to third distributors 314, 316 and 318.

In the control section, the outputs of the first to third current detectors 302, 305 and 308 in the first to third half-bridge converters 300, 303 and 306 are all added by the adder 309 and input to the second error amplifier 27. In addition, the current reference signal obtained by the first error amplifier 23 is input to the second error amplifier 27, and the sum of the respective output currents is controlled so as to conform to the current reference signal. Hence, in the switching power supply in accordance with Embodiment 2, since the output currents of the respective half-bridge converters are not controlled individually, there is no factor of instability, whereby stable operation is attained.

In the switching power supply in accordance with Embodiment 2, the respective outputs of the first current detector 302, the second current detector 305 and the third current detector 308 are added by the adder 309, and input to the second error amplifier 27. However, the adder for use in the present invention is not required to be an addition circuit in a strict sense. It may be a circuit having an offset required for securing the operating points of the adder 309 and the second error amplifier 27. Even when this kind of circuit is used, the switching control operation of the switching power supply in accordance with Embodiment 2 is not affected.

In addition, even when a nonlinear arithmetic unit having a monotone increasing or decreasing function and being symmetric with respect to each input, such as integrator, is used instead of the adder, since the converters are not current-controlled individually, the effect of the present invention, that is, stable output, is maintained. In particular, in the case when the adder is used, the current for charging the smoothing capacitor is proportional to the result of the addition, that is, the output of the adder. Therefore, it is possible to maintain the advantages of the current mode control, that is, stable operation and a small phase lag due to the output voltage having a first-order lag with respect to the added current.

In the switching power supply in accordance with Embodiment 2, a switching power supply having three converters is taken as an example. However, even in the case of a switching power supply having four or more converters, when the switching power supply is configured so that the currents of the respective converters are detected and added and the sum of the addition is controlled, it is needless to say that effects similar to those of Embodiment 2 can be obtained.

In Embodiment 2, an example of using an adder is described. However, without using the adder, it may be possible to have a configuration wherein one of the outputs of the three converters is directly input to the second error amplifier 27, that is, a configuration wherein one of the detection signals of the first current detector 302, the second current detector 305 and the third current detector 308 is input to the second error amplifier 27.

Furthermore, in Embodiment 2, a half-bridge converter is taken as an example of a converter. However, even when other switching converters, such as forward-type, bridge-type or push-pull-type converters, are used, similar effects are obtained.

Just like the switching power supply in accordance with Embodiment 1, the switching power supply in accordance with Embodiment 2 is also particularly effective as a power supply for supplying electric power to semiconductor devices.

As is clear from the above-mentioned detailed descriptions of the embodiments, the present invention has the following effects.

The present invention can provide a switching power supply being highly stable, compact and highly efficient, capable of attaining the object of carrying out the simultaneous use of the series connection system on the input sides of switching power supply circuits and the current mode control inside one apparatus, and capable of properly maintaining the balance in current without impairing the characteristics of the conventional current mode control even when a plurality of switching power supply circuits are connected in series. The present invention can also provide the control method therefor.

The switching power supply in accordance with the present invention has an excellent effect of attaining stable operation and stable control even when the input sides of a plurality of switching power supply circuits are connected in series and their output sides are connected in parallel, and even when the current mode control is carried out by the control section.

Furthermore, the control method for the switching power supply in accordance with the present invention has excellent effects of attaining high stability and properly maintaining the balance in current without impairing the characteristics of the current mode control even when a plurality of converters are connected in series.

Although the present invention has been described with respect to its preferred embodiments in some detail, the disclosed contents of the preferred embodiments may change in the details of the configuration thereof, and any changes in the combination and sequence of the components may be attained without departing from the spirit and scope of the claimed invention.

The invention claimed is:

1. A switching power supply comprising:
   a plurality of converters, each comprising a plurality of switching means, transforming means and rectifying means, connected in series on the input sides and in parallel on the output sides, thereby outputting a single output DC voltage,
   a first error amplifier for generating a first error signal by comparing said single output DC voltage output from said converters with a reference voltage and for amplifying said first error signal,
   an arithmetic unit for generating a single output current signal by detecting the currents output from said rectifying means of said plurality of converters,
   a second error amplifier for generating a second error signal by comparing said single output current signal from said arithmetic unit with the output of said first error amplifier and for amplifying said second error signal, and
   a plurality of PWM signal generators for generating PWM signals on the basis of the output signal of said second error amplifier and for PWM controlling said plurality of switching means.

2. The switching power supply in accordance with claim 1, wherein each of said PWM signal generators comprises a triangular wave generator for generating a reference triangular wave signal, a comparator for comparing said reference triangular wave signal of said triangular wave generator with said output signal of said second error amplifier, and a distributor for generating a PWM signal on the basis of the comparison result of said comparator and for PWM controlling said switching means corresponding thereto.

3. The switching power supply in accordance with claim 2, wherein each of Q pieces of converters has a plurality of capacitors connected in series across the input terminals, said capacitors are connected to different switching means, the triangular wave generators of Q pieces of PWM signal generators output reference triangular wave signals having a phase difference of π/Q therebetween, and said PWM signal generator changes the switching timing of each converter by using said reference triangular wave signal and said output signal of said second error amplifier.

4. The switching power supply in accordance with claim 1, wherein said arithmetic unit is formed of an adder, and said adder adds the currents output from said respective rectifying means of said plurality of converters to generate said single output current signal.

5. The switching power supply in accordance with claim 1, wherein said converter is formed of a half-bridge converter.

6. The switching power supply in accordance with claim 1, wherein the phase of said PWM signal generated by said PWM signal generator is shifted at substantially equal intervals.

7. The switching power supply in accordance with claim 1, wherein electric power is supplied to semiconductor devices.

8. A control method for a switching power supply comprising a plurality of converters, each comprising a plurality of switching means, transforming means and rectifying means, connected in series on the input sides and in parallel on the output sides, thereby outputting a single output DC voltage, comprising
   a step of generating a first error signal by comparing said single output DC voltage with a reference voltage and of amplifying said first error signal,
   a step of generating a single output current signal by calculating the currents output from said rectifying means of said plurality of converters,
   a step of generating a second error signal by comparing said single output current signal with said first error signal amplified and of amplifying said second error signal, and
   a step of generating PWM signals on the basis of said second error signal amplified and of PWM controlling said respective plurality of switching means.

9. The control method for a switching power supply in accordance with claim 8, wherein at said step of PWM controlling said switching means, a triangular wave generator outputs a reference triangular wave signal, a comparator compares said reference triangular wave signal with said second error signal amplified, and a distributor generates a PWM signal on the basis of the comparison result of said comparator and PWM controls said switching means corresponding thereto.

10. The control method for a switching power supply in accordance with claim 8 wherein each of Q pieces of converters has a plurality of capacitors connected in series across the input terminals, and each of said capacitors are connected to different switching means, wherein the triangular wave generators of Q pieces of PWM signal generators output reference triangular wave signals having a phase difference of π/Q therebetween, PWM signals are generated by using said reference triangular wave signals, and the switching timing of each converter is changed.

11. A switching power supply comprising:
   a plurality of converters, each comprising a plurality of switching means, transforming means and rectifying means, connected in series on the input sides and in parallel on the output sides, thereby outputting a single output DC voltage,
   a first error amplifier for generating a first error signal by comparing said single output DC voltage output from said converters with a reference voltage and for amplifying said first error signal,
   a second error amplifier for generating a second error signal by comparing the current signal output from said rectifying means of one of said plurality of converters with the output of said first error amplifier and for amplifying said second error signal, and
   a plurality of PWM signal generators for generating PWM signals on the basis of the output signal of said second error amplifier and for PWM controlling each of said plurality of switching means.

* * * * *